J. LACEY.
Wheel-Cultivator.
No. 41,743.
Patented Feb 23, 1864.
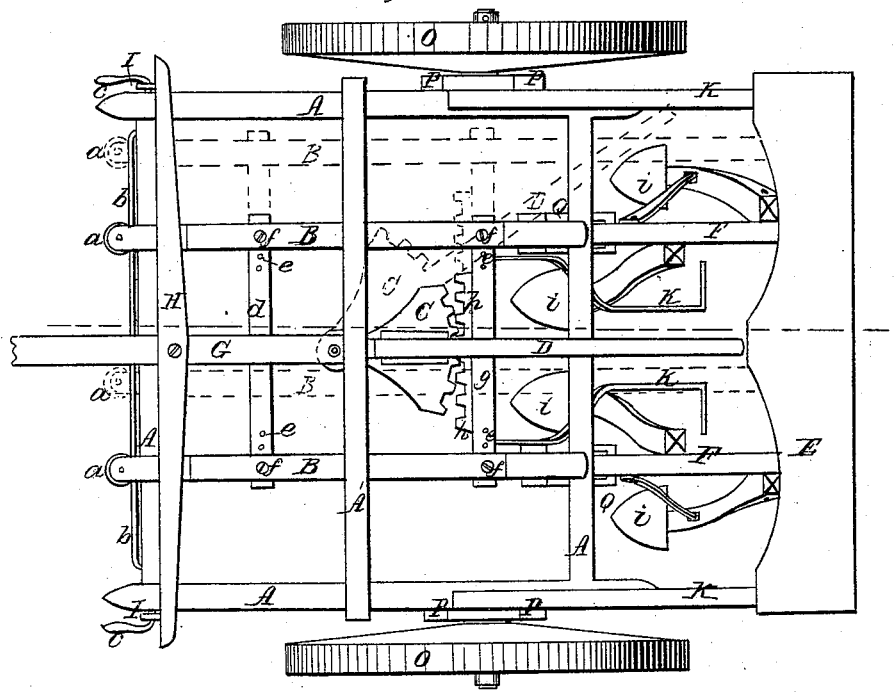
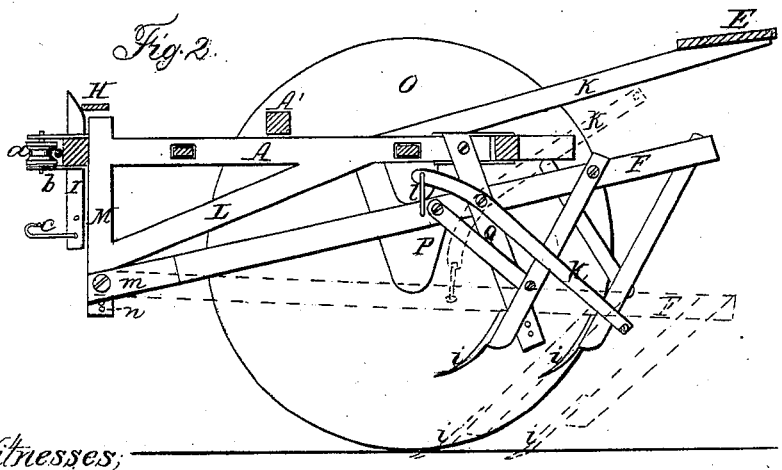
Witnesses:
John E. Cone
G. W. Gray
Inventor:
John Lacey

UNITED STATES PATENT OFFICE.

JOHN LACEY, OF CHICAGO, ILLINOIS, ASSIGNOR TO HIMSELF AND CONRAD FURST AND DAVID BRADLEY, OF SAME PLACE.

IMPROVEMENT IN CULTIVATORS.

Specification forming part of Letters Patent No. 41,743, dated February 23, 1864.

*To all whom it may concern:*

Be it known I, JOHN LACEY, of the city of Chicago, in the county of Cook and State of Illinois, have invented certain new and useful Improvements in Corn-Cultivators; and I do hereby declare that the following is a full, clear, and exact description thereof, reference being had to the accompanying drawings, making a part of this specification, in which—

Figure 1 is a top view, and Fig. 2 a vertical section at the red line of Fig. 1.

Like letters refer to similar parts in both of the figures.

The nature of my invention consists in a novel arrangement of the parts of a cultivator heretofore known, so as to produce a new, simple, and cheap cultivator.

To enable others skilled in the art to make and use my invention, I will proceed to describe its construction and operation.

The frame A is made of wood and mounted on wheels O, and is raised above the center of the wheels by means of the raised axle P. It is made of a sufficient width to pass over one row of corn and between the rows on each side of the one cultivated, it being of the class usually denominated "straddle-row cultivators," or those which cultivate both sides of one row of corn by a single operation.

Inside of the main frame A, I insert or place a movable frame composed of the pieces B, F, M, L, d, and g. This movable frame is adjustable in width by means of the holes e in the cross-bars d and g and the pins f, and by placing the pins in the inside holes of the cross-bar d and leaving them in the outer ones in the bar g, or by changing the operation and leaving them in the outer holes of d and placing them in the inside holes of g, a greater variation of the distance between the sets of plows on the beams F is obtained than can be had by keeping them parallel and without injury to their operation.

At the front edge of the cross-bar g, I attach a rack, h, running the entire length of the cross-bar between the holes e. To this is fitted a pinion, C, which is hinged to the draft-pole at o, and to this pinion a lever, D, is attached by means of a raised slot, as shown, or by bolts, as may be thought desirable. The lever D is carried back to the driver's seat E, and by means of this arrangement the driver is enabled to move the frame supporting the plows in either direction, as he may desire, to pass around such hills of corn as are out of the line of the row without destroying them. In order that this operation may be performed with more ease and certainty when the plows are in the ground, I place a rod or bar, b, on the front of the frame A and carry the front ends of the beams B beyond that portion of A by bars made of iron or other suitable material, in which I insert the wheels or pulleys a. If a flat bar, b, is used, I use plain wheels; but if a round one, as shown, is used, I then make the wheels with grooves, and I consider this best, as when the wheels are properly adjusted they are made to sustain the vertical as well as lateral pressure, and thereby in a great measure overcome the friction of the draft of the plows, so that I am able to move the inner frame with ease and rapidity under all circumstances. A modification of this arrangement can be made by carrying the wheels a to the rear end of the beams B and the rod or bar b to the rear cross-piece of the frame A, and I do not confine myself to the front in applying it.

The plow-beams F are attached in front to the pendant M, which is provided with holes n, and by means of these and the pin m, I am enabled to raise or lower the front ends of the plow-beams F, and thereby in a measure adjust the set or pitch of the plows i. The plow-beams are attached to the pendant by means of straps of iron or other suitable device or material. The plow-beams F are further supported and held in place by means of stirrups Q, which are attached to the beams B near their rear ends. These stirrups may be perforated with holes and a pin used to regulate the distance which they will descend. On the inside strap of these stirrups, below the beams B, I pivot the foot-lever or treadle k, on the rear end of which a place for the foot is provided, and at the front end a hook or link is inserted, by means of which it is attached to the plow-beam F. The beams F may be raised together or separately by this device, or it may be substituted by any of the numerous devices already known for the purpose of raising the plows.

The driver's seat E is attached to the frame A by means of the inclined bars or pieces K, and the pendent piece M is supported by the brace L.

The draft-pole G is made of the usual length and size, and the rear end fastened to the cross-piece A' and to the front of the frame A at its crossing. On this draft-pole or tongue, just back of its front fastening, I pivot the double-tree H, which is a straight piece of wood extending a little beyond the frame on each side. At the front end of the frame A, on each side, I also pivot, at or near their center, upright pieces or bars I, the upper ends of which rest loosely against the front edge of the double-tree, and at the lower ends are provided with a series of holes, so that the hooks $c$ may be raised or lowered. To these hooks $c$ ordinary whiffletrees are attached.

The plows $i$ are made of any desired pattern and attached to the beams as may be thought best, the whole forming when complete a cheap, desirable, and easily-operated cultivator.

Having thus fully described my cultivator, I am aware that pulleys, rods, rack and pinions, and foot-levers have before been used in cultivators. I do not therefore claim them as new or of my invention; but

What I claim as my invention, and desire to secure by Letters Patent, is—

The combination and arrangement of the movable adjustable frame B, pivotal lever D, segment-pinion C, and rack $h$ with pulleys $a$, rod $b$, and foot-levers $k\,k$, the whole constructed and operating in the manner and for the purposes herein set forth.

JOHN LACEY.

Witnesses:
 JOHN E. CONE,
 G. W. GRAY.